Figure 1:
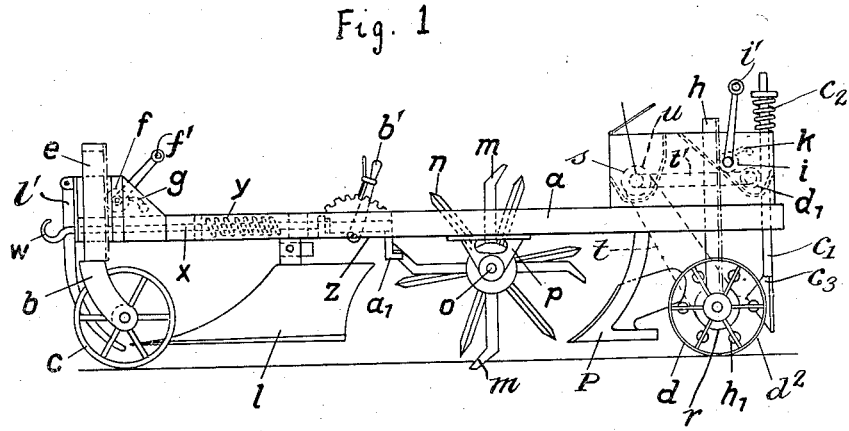

Jan. 14, 1936.  F. WEISMÜLLER  2,027,502

SYLVICULTURAL MACHINE

Filed March 3, 1934

Inventor:
Friedrich Weismüller
by Knight Bros
attorneys

Patented Jan. 14, 1936

2,027,502

UNITED STATES PATENT OFFICE 2,027,502

SYLVICULTURAL MACHINE

Friedrich Weismüller, Saarbrucken, Germany

Application March 3, 1934, Serial No. 714,480
In Germany March 2, 1933

5 Claims. (Cl. 111—1)

The invention relates to a forest soil cultivating machine which, as the case may be, embodies a number of different individual cultivating implements, such as a forest plough, tearing grubber, burrowing grubber, roller harrow, two-share heaping-up plough, artificial manure spreader, automatic hoe, furrow drawer and sowing device, each of which is dependent for its proper operation from the function of one or several of the preceding implements of the machine.

The invention represents a quite novel combination of implements which permit of carrying out a great variety of forest cultivating operations. The tools combined on the machine may be employed both individually and conjointly in any desired combination, thus for instance the machine affords the possibility of using in a single operation the plough, the tearing grubber, the heaping-up plough, the artificial manure spreader and the sowing device. The same tools may be used for planting work, in which case the sowing device is substituted by the automatic hoe. With regard to grubber work special emphasis is laid on the particular feature that the fixed tearing and revolving burrowing tools are arranged in alternative succession on a rotatable shaft. The rotation of the shaft may be interrupted or restored at will by means of a locking and releasing mechanism.

For forest soil cultivation implements with fixed tearing tools are indispensable, as rotatable tools will produce satisfactory results only in very special cases. The employment of rigid grubbing and tearing implements, such as are customary at present, has the great disadvantage that the implements are caught and arrested frequently by obstacles occurring in the forest soil (protruding tree stumps, subterranean invisible strong tree roots, big stones etc.). Apart from costly time lost in removing the obstacle, this resulted in excessive exertion of the tool operator, undue efforts of the draft animals and great strain on the implement. Rigid implements of this character have the additional disadvantage that they drag along with them bulky materials, such as brushwood, heath, bilberry herbs, turf cuts etc. This produces the troublesome clogging of the implements well-known in the forest soil cultivation, rendering frequent and time consuming cleaning during the work unavoidable. All these defects are entirely removed in the cultivating machine according to the present invention.

For carrying out the various operations possible with the machine, up to the present nine separate implements were required, which means an increased power consumption and a higher operating cost due to their separate operation.

Figure 2:
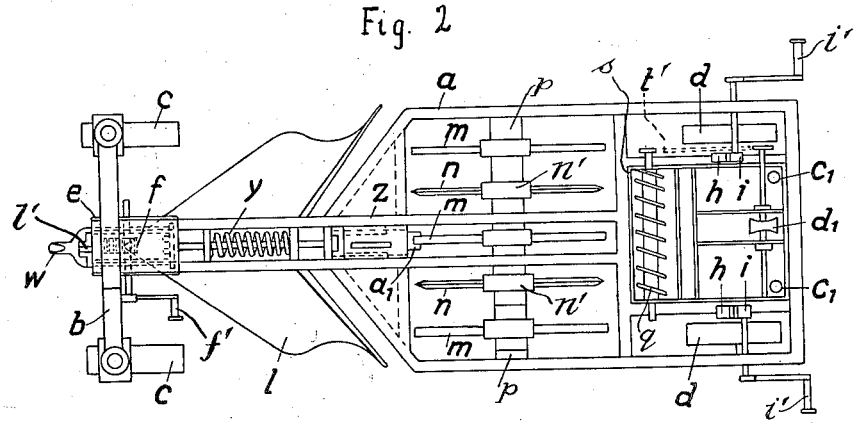

My invention is illustrated in the accompanying drawing which represents in Fig. 1 a side elevation, and in Fig. 2 a plan view of the cultivating machine. In the illustrations $a$ shows a frame carrying all component devices of the machine, $b$ a forward undercarriage attached to frame $a$, and on which the forward wheels $c$ are pivotally mounted in caster fashion. $e$ is a vertical toothed rack provided on the forward undercarriage and which cooperates with pinion $f$ journalled on frame $a$ and operable by a hand crank $f'$. By means of this pinion and hand crank $f'$, the undercarriage $b$ can be raised and lowered at will so as to set the proper operative depth for the implements to be described later. A pawl $g$ engages pinion $f$, so that the latter can be locked for the desired position of the undercarriage. For a similar purpose each of the two rear wheels $d$ can be individually raised and lowered with respect to frame $a$ by means of an individual vertical rack $h$, meshing with a pinion $i$ journalled on frame $a$ and operated by a hand crank $i'$, and lockable by a pawl $k$.

A large plough share $l$ is fixed to the forward portion of frame $a$ and preceded by a rearwardly curved guard hook $l'$ which is fixed on frame $a$ and whose tip extends down to the level of the plough share tip. By this guard the entire forward part of the frame $a$ is lifted when the machine encounters an immovable object such as a hidden tree stump, roots or rocks over which thus the plough share can slide. $m$ and $n$ are respectively three four-spiked tearing and two six-spiked burrowing grubbers alternating with one another transversely of the frame as shown in Fig. 2. The tearing grubbers $m$ are all fixed on a transverse shaft $o$, journalled at $p$ in frame $a$, while the burrowing grubbers $n$ are individually rotatable on shaft $o$, the spikes of the latter grubbers being mounted on sleeves $n'$, which are freely rotatable on this shaft. Behind the grubbers is fixed to the sides of frame $a$ a two-share hilling plough P, for hilling up the soil cultivated by the preceding implements. In this manner a furrow of 80 cm. width dug by the main plough $l$ and deepened by the tearing and burrowing grubbers can be raised into a sowing or planting strip of about 50 cm. in width. Strips thus raised are a recognized protection for young plants against overgrowth by weeds or against detrimental fungi.

The hilling plough is followed by a fertilizer spreading device which consists of a container $s$ which holds the fertilizer and in which a spreading device, indicated by the worm $q$ is mounted. Worm $q$ is driven by the sprocket wheel $r$, attached to one of the rear wheels $d$, over chain $t$ and sprocket wheel $u$ mounted on the worm shaft. The spreading device delivers the fertilizer to the soil ahead of the hilling plough P, so that the latter covers the fertilizer with soil. Behind the fertilizer spreader is mounted the sowing device $d'$ which may be operated through a sprocket and chain drive $t'$ from the sprocket wheel $r$. Lastly, close to the sowing device are mounted in frame $a$ two automatically vertically operating hoes $c_1$, one being located near each of the rear machine wheels $d$. These hoes have at their lower ends a massive steel plate $c_3$ and are normally thrust downwardly by individual spiral springs $c_2$ of about 40 cm. length acting at their upper ends, but are lifted intermittently by cam drives mounted on the two rear wheels. Each cam drive consists of a disc $d_2$ attached to the machine wheel and on this disk are spaced apart near its periphery cam pins $h_1$, which extend in the direction of the disk axis, and within the range of the appertaining hoe plate $c_3$ so that the latter is lifted by each cam pin, as it comes around, against the tension of spring $c_2$, whereafter the hoe is flung back against the loosened soil, punching a planting hole into it.

Since the downward action of the spring $c_2$ is supported by the weight of the hoe (about 20 kilograms), a planting hole about 25 cm. in depth and about 20 cm. width can be punched. When the next cam pin comes within the range of the hoe blade the hoe is lifted again and made ready to punch the next hole. In this manner, and with the cultivation of the soil by the preceding tools from 20,000 to 25,000 planting holes may be dug in one working day.

For sowing purposes the hoes may be locked in their elevated positions or for sowing larger seeds (such as oak or beech) the hoes may be adjusted at a suitable depth at which they draw furrows into the loosened soil into which the seeds are dropped by the sowing device. In this case the cam pins $h_1$ are temporarily removed from disks $d_2$.

In order to prevent the blocking of the progress and operation of the machine, in case an immovable object such as a heavy stone or a hidden stump or root is encountered, the following arrangement is provided according to the invention.

Ordinarily, i. e. during their normal operation, the grubbers $m$ are prevented from rotating by a locking plate $a_1$ which is normally disposed in the path of the ends of the tearing grubber spikes, so that, as shown in Fig. 1, the forwardly directed grubber spike will rest against this plate and thus prevent the tearing grubber shaft from rotating and thus causes the downwardly directed spikes to function in the soil. This plate $a_1$ can be removed from the path of the tearing spikes, in case the latter encounter an immovable object, in the following manner. The draw bar of the machine, to the forward end of which the draw hook $w$ is attached is spring cushioned by spring $y$, which is so dimensioned that the pull on the bar during the normal operation of the machine will compress this spring only little. The rear end of draw bar $x$ carries the locking arm $z$ which consists of three superposed steel plates of which the upper and lowermost are rigidly connected together, and to the draw bar end, to form a frame, in which the third plate which is formed by the previously mentioned locking plate $a_1$ can horizontally slide in the direction of the draw bar axis. This locking plate can be adjusted and fixed by hand lever $b_1$ in different positions, i. e. it can be protruded from its frame sufficiently as shown in the drawing, so that at slight pulls on the draw bar it still stands in the path of the tearing grubber spikes and prevents their rotation as described, or it can be withdrawn entirely from this path by hand lever $b_1$, in which case the tearing grubbers are free to rotate under all pull-load conditions. If now with the locking plate adjustment shown an immovable obstacle should be encountered by the tearing grubber spikes, the pull exerted upon the draw bar increases to such an extent that spring $y$ is sufficiently compressed to withdraw plate $a_1$, from the path of the tearing grubber spikes $m$, and to permit the latter to freely rotate and to "step", as it were, over the obstacle. As soon as the obstacle has been cleared and the excessive pull on the draw bar been diminished, spring $y$ again moves the draw bar rearwardly and the latter thereby places locking plate $a_1$ back into the path of the tearing grubber spikes and locks them in the normal tearing operation position.

Aside from thus freeing the tearing grubbers from the obstacle, this unlocking operation has the further advantage of causing the lifting of the rearwardly positioned cultivating tools over the obstacle. It will be noted that the tearing grubber spikes $m$ reach considerably below the level of the hilling plough P, and that they are provided with forwardly directed points. If now such a spike steps over the obstacle, directly behind which the ground is untouched, this spike will lift the entire rear portion of the machine off the ground and thus permit the rearwardly mounted tools to clear the obstacle. Practical use of the machine has demonstrated that this automatic unlocking and relocking is absolutely dependable and consumes from 2 to 3 seconds, and that no interruption of the forward progress of the cultivating machine is occasioned thereby. By suitably adjusting hand lever $b_1$ the unlocking of the tearing grubbers may be adjusted for any desirable pull. As was explained previously, the front end of the machine and the front tools, such as plough $l$, are lifted over the obstacle by the guard hook $l'$.

If for any reason it should be necessary to manually release the tearing grubbers during operation this can be easily accomplished by the operator throwing the hand lever $b_1$ into its extreme forward position. Further, if the tearing grubbers remain unlocked, they may be used together with the burrowing grubbers $n$ as a 24 roller harrow.

The aforedescribed forest cultivating machine thus not merely combines into a single operating unit a number of formerly individually operated implements, but by the mounting and the construction of certain individual implements it renders the operation of other implements more effective and even possible in case of encountered obstacles, without interrupting the forward progress of the cultivating machine, and thus the machine not only saves power and labor, but materially increases the acreage output and reduces the operating costs.

I claim:

1. In a forest cultivating vehicle in combination a vehicle frame, a forest plough mounted near the front end of the frame for cutting and clearing the vegetation off the soil strip to be cultivated, a rearwardly bent guard hook, fixed on the front of said frame and extending to the plough tip for lifting the plough over immovable obstacles, a transverse axle rotatably mounted on said frame behind said plough, tearing grubbers fixed on said axle and burrowing grubbers rotatably mounted on said axle in alternating succession with said tearing grubbers, for simultaneously tearing up and comminuting the soil on the strip cleared by said plough, a two share strip heaping plough mounted behind said grubbers on said frame for heaping up the comminuted soil, means mounted behind said heaping plough for planting the cultivated strip, means for normally arresting the tearing grubbers and means, controlled by the pull exerted to draw the vehicle, for releasing said arresting means when said grubbers encounter an immovable obstacle, to permit said grubbers to rotate long enough to step over the obstacle and to thereby lift the rear portion of the vehicle to clear said heaping plough and planting means of the obstacle.

2. In a forest cultivating vehicle in combination a vehicle frame, a forest plough mounted near the front end of the frame for cutting and clearing the vegetation off the soil strip to be cultivated, a transverse axle rotatably mounted on said frame behind said plough, tearing grubbers fixed on said axle and burrowing grubbers rotatably mounted on said axle in alternating succession with said tearing grubbers, for simultaneously tearing up and comminuting the soil on the strip cleared by said plough, means for normally arresting the rotation of said tearing grubbers, and means controlled by the pull exerted to draw the vehicle, for releasing said arresting means when a tearing grubber encounters an immovable obstacle, to permit said grubbers to rotate long enough to step over the obstacle.

3. In a forest cultivating vehicle in combination a vehicle frame, a forest plough mounted near the front end of the frame for cutting and clearing the vegetation off the soil strip to be cultivated, a rearwardly bent guard hook, fixed on the front of said frame and extending to the plough tip for lifting the plough over inmovable obstacles, a transverse axle rotatably mounted on said frame behind said plough, tearing grubbers fixed on said axle and burrowing grubbers rotatably mounted on said axle in alternating succession with said tearing grubbers, for simultaneously tearing up and comminuting the soil on the strip cleared by said plough, a two share strip heaping plough mounted behind said grubbers on said frame for heaping up the comminuted soil, and a fertilizer spreader on said frame, disposed between said grubber and said heaping plough, and being operated by the travel of the vehicle, for delivering fertilizer onto the grubbed soil so that the fertilizer becomes covered with soil by said heaping plough, means for normally arresting the tearing grubbers and means, controlled by the pull exerted to draw the vehicle, for releasing said arresting means when said grubbers encounter an immovable obstacle, to permit said grubbers to rotate long enough to step over the obstacle and to thereby lift the rear portion of the vehicle to clear said heaping plough of the obstacle.

4. In a forest cultivating vehicle in combination a vehicle frame, a forest plough mounted near the front end of the frame for cutting and clearing the vegetation off the soil strip to be cultivated, a transverse axle rotatably mounted on said frame behind said plough, tearing grubbers fixed on said axle and burrowing grubbers rotatably mounted on said axle in alternating succession with said tearing grubbers, for simultaneously tearing up and comminuting the soil on the strip cleared by said plough, a two share strip heaping plough mounted behind said grubbers on said frame for heaping up the comminuted soil, and a vertically operative hoe disposed behind said heaping plough, and means for actuating said hoe by the travel of the vehicle, for punching planting holes into the heaped soil strip, means for normally arresting the tearing grubbers and means, controlled by the pull exerted to draw the vehicle, for releasing said arresting means when said grubbers encounter an immovable obstacle, to permit said grubbers to rotate long enough to step over the obstacle and to thereby lift the rear portion of the vehicle to clear said heaping plough and said hoe of the obstacle.

5. In a forest cultivating vehicle in combination a vehicle frame, a forest plough mounted near the front end of the frame for cutting and clearing the vegetation off the soil strip to be cultivated, a transverse axle rotatably mounted on said frame behind said plough, tearing grubbers fixed on said axle and burrowing grubbers rotatably mounted on said axle in alternating succession with said tearing grubbers, for simultaneously tearing up and comminuting the soil on the strip cleared by said plough, a two share strip heaping plough mounted behind said grubbers on said frame for heaping up the comminuted soil, and a vertically operative hoe disposed behind said heaping plough, and means for actuating said hoe by the travel of the vehicle, for punching planting holes into the heaped soil strip, and means for arresting said hoe in its lower end position to cause the hoe to draw furrows in the heaped soil strip, means for normally arresting the tearing grubbers and means, controlled by the pull exerted to draw the vehicle, for releasing said arresting means when said grubbers encounter an immovable obstacle, to permit said grubbers to rotate long enough to step over the obstacle and to thereby lift the rear portion of the vehicle to clear said heaping plough and said hoe of the obstacle.

FRIEDRICH WEISMÜLLER.